United States Patent Office 3,009,885

Patented Nov. 21, 1961

1

2

3,009,885

ALUMINA CATALYST OF INCREASED SURFACE AREA

Ralph J. Bertolacini, Chesterton, Ind., assignor to Standard Oil Company, Chicago, Ill., a corporation of Indiana No Drawing. Filed June 23, 1958, Ser. No. 743,977
10 Claims. (Cl. 252—441)

This invention relates to hydrous metal oxides and more particularly to a method of treating hydrous metal oxides, prior to drying and calcining, with hydrogen peroxide whereby the surface area of the resulting product, after drying and calcining, is substantially altered.

Large quantities of metal oxides are used in present-day manufacturing operations, particularly in the chemical and petroleum field, as adsorbents, catalysts, and as supports for other catalytic materials, e.g., alumina, silica, titania, zirconia, magnesia, and the like, and mixtures thereof. Among the important physical properties of such metal oxides, particularly alumina, are surface area, pore diameter, pore volume, pore-size distribution, and the like. Such properties are usually dependent upon the particular starting materials from which the metal oxide is prepared and also the particular method of preparation. For any particular starting material and method of preparation, the surface area, pore size, and the like fall within a very narrow range. For example, alumina prepared by drying and calcining a Heard-type alumina hydrosol (Heard Reissue 22,196, October 6, 1942) normally has a surface area of about 225 to 240 square meters per gram.

For many purposes, however, it is desirable to adjust such properties of alumina to other than the normal ranges. For example, when selectively treating a particular size range molecule, it is often advantageous to have a particular alumina pore size. Another typical example is encountered when alumina is employed in a halide-containing platinum-alumina composite. When such composite is used in regenerative hydroforming (such as exemplified by Ultraforming—Petroleum Engineer, vol. XXVI, No. 4, April 1954, at page C-35), it has been found that the number of regenerations to which the catalyst can be subjected and, thus, catalyst life is limited by an economic minimum surface area. Each regeneration tends to decrease the surface area slightly; thus, there is a substantial incentive to raise the surface area of the catalyst when freshly prepared so that the maximum number of regenerations and, thus, catalyst life is maximized. Increased surface area also has the advantage, under certain circumstances of increasing the retentivity by the catalyst of halogen activators, e.g., fluorine or chlorine.

The prior art teaches methods of adjusting surface area, pore volume, and the like. Unfortunately, such methods are often costly and/or necessitate drastic techniques such as, for example, incorporating spacers which may or may not be removed by subsequent calcination, steaming, and the like. Such measures often are accompanied by undesired side effects, such as decreased crushing strength and attrition resistance of the alumina aggregate and destruction or modification of the catalytic properties of the alumina composite, for example removal of activators, e.g., halogen, or changing the crystalline structure of the alumina itself, e.g., from the active gamma, eta, or chi phases to the inactive alpha phase.

It is therefore an object of the present invention to provide a method of adjusting, that is, increasing, surface area and/or pore volume of hydrous metal oxides, e.g., alumina, during preparation. Another object is to prepare platinum-alumina composites of substantially increased surface area. These and other objects of the present invention will be apparent from the following detailed description thereof.

It has now been discovered that the surface area of alumina can be substantially increased by subjecting the alumina when it is in the form of "hydrous alumina," as hereinafter defined, to contact with hydrogen peroxide. Thus, in accordance with the present invention, hydrous alumina is contacted, prior to drying and calcining, with hydrogen peroxide for a period in excess of 0.1 per minute, and is then dried and calcined to produce a high-surface-area alumina. Another catalytic substance, such as, for example, platinum, palladium, nickel, cobalt, ruthenium, rhodium, silica, molybdena, chromia, halogen (e.g., fluorine or chlorine), and the like, and mixtures thereof may be incorporated into the hydrous alumina before or after treatment with hydrogen peroxide or, alternatively, the resulting treated alumina after drying, or after drying and calcining, may be impregnated or otherwise mixed with such other catalytic substance or substances.

The hydrogen peroxide usually employed in the practice of the present invention is an aqueous solution containing at least about 5 percent by weight, based on solution, of $H_2O_2$. Concentrated solutions containing as high as 98 percent by weight of hydrogen peroxide may also be employed, although such concentrated solutions are normally avoided because of expense and handling hazards. I normally prefer to use solutions containing about 10 to 50 percent by weight of $H_2O_2$ and, within that range, the ordinary hydrogen peroxide solution of commerce has been found to give satisfactory results, that is, commercial solutions containing about 25 to 35 percent by weight of $H_2O_2$. For significant increase in surface area the weight ratio of $H_2O_2$ to $Al_2O_3$ being treated should at least be about 0.1, e.g., about 0.1 to 10, and preferably about 0.5 to 2.

Contact time should be at least about 0.1 minute, preferably about 0.5 minute to 0.5 hour. To assure intimate contacting of hydrous alumina and hydrogen peroxide solution, the mixture is usually agitated, for example, by stirring, swirling, and the like, particularly when minimum contact periods are employed, e.g., about 0.1 to 1.0 minute. When longer contact periods are employed, agitation is usually employed for only about the first minute.

Ambient temperatures or temperatures above or below ambient temperatures may be employed when treating the hydrous alumina with hydrogen peroxide. Usually ambient temperatures are preferred over higher temperatures to minimize break down and/or loss by vaporization of the hydrogen peroxide. Atmospheric pressures or pressures above or below atmospheric pressures may also be employed. At ambient temperatures, pressures not significantly above atmospheric pressures are usually employed. With temperatures significantly above ambient temperatures, e.g., above 100° F., pressures above atmospheric are usually employed to minimize the vaporization of the treating solution. Temperature and pressure should, of course, be correlated to prevent boiling of the treating solution.

As previously pointed out, the present technique is applicable to the treatment of "hydrous alumina," which for the purpose of the present invention is defined as alumina containing water of hydration, i.e., alumina containing 18 percent by weight, or more of water, e.g., alumina hydrosols, alumina hydrogels, alumina ultragels, alpha alumina trihydrate, beta alumina trihydrate, alpha alumina monohydrate, and the like. Hydrous alumina is therefore to be differentiated from alumina which has been dried below the monohydrate level, even though such dried alumina often contains substantial (e.g., 1–10 percent) chemi-sorbed water, e.g., chi, gamma and eta alumina (see "Alumina Properties," Technical Paper No. 10, revised, by A. S. Russell et al., copyright 1956, Aluminum Company of America). The fact that the present treating technique is applicable to alumina only when such alumina contains water of hydration, that is, has not been dried and/or calcined, suggests that the technique brings about a definite configuration in the alumina-water structure prior to dehydration. After dehydration, e.g., drying below a water content of about 18 percent by weight, such structural configuration apparently can no longer be substantially adjusted by treatment with hydrogen peroxide. The above explanation, however, is advanced as one possibility only, and is not to be considered limiting or binding in any way.

A particular advantageous type of hydrous alumina for use in practicing the invention is alumina hydrosol prepared by the technique described in Heard Reissue 22,196 (October 6, 1942). According to this technique, aluminum metal in the form of sheets, granules, turnings, sawdust, chips, shot, rings, irregular shapes, or the like, is subjected to amalgamation by contact with mercury or an aqueous solution of a mercury salt. The amalgamated aluminum is then digested in water in the presence of a low concentration (suitably around 2 percent by weight) of acetic acid or other weak organic acid as a peptizing agent.

The reaction goes forward readily at ordinary or autogenous pressures and at temperatures above about 100° F., preferably between about 125 and 160° F. Thick, viscous hydrosols can be obtained at temperatures above about 160° F., while relatively thin hydrosols, which are preferred, are obtained at temperatures below about 160° F. The reaction gradually slows down after about 24 hours and ordinarily ceases for all practical purposes after about 30 hours. The reaction product is thereafter clarified by settling, centrifugation, filtration, or the like, to remove any suspended solids, including particles of metallic mercury. The hydrous alumina product is a syrupy liquid of opalescent, nearly-transparent appearance, containing from around 2 to 10 percent by weight of $Al_2O_3$.

The hydrous alumina, prepared as described above, may be treated in accordance with the present invention directly. Alternatively, an electrolyte, e.g., ammonium hydroxide, may be added to convert the hydrosol to a gel, or, at high pH's, i.e., pH's in excess of 8.5, to convert the hydrosol to a precipitate of solid hydrous alumina, which may then be treated with hydrogen peroxide. After treatment the hydrous alumina may be dried, e.g., at about 200 to 600° F. for 1 to 24 hours, and calcined, e.g., at about 600 to 1200° F. for about 1 to 24 hours. Drying and calcining may be carried out as one continous step, that is, by raising temperature over a period of time until calcination temperatures are reached. Subjecting hydrous alumina to calcination temperatures without preliminary drying is not usually advisable because rapid release of water of hydration may create internal pressures within the alumina, and thus lead to fissures, cracks, and the like.

The alumina produced in accordance with the present invention can be prepared in any of the usual mechanical forms. It can be ground to a powder for use in fluidized form. It can be broken into irregular fragments. It can be prepared in various shapes, such as pills, pellets, rings, rosettes, saddles, and the like, as desired. It is suitable per se as a catalyst for various processes, such as the dehydration of alcohols, the reaction of methanol and ammonia to produce methylamines, the vapor-phase finishing of synthetic gasolines, and the like. As previously noted, the alumina is also a highly-satisfactoy support for one or more catalytic materials, such as, molybdena, chromia, platinum, nickel, palladium, cobalt, silica, ruthenium, halogens, rhodium, and the like. The addition of such other catalytic substances is conveniently carried out before, or after treating with hydrogen peroxide, according to the technique described in the art, e.g., cogelling, impregnation, and the like. In all cases the resulting catalyst will have a larger surface area than would be obtainable without the treating step.

Alumina of increased pore volume and surface area is broadly useful for the conversion of hydrocarbons, e.g., reforming, isomerization, hydrogenation, hydrocracking, dehydrogenation, and other hydrocarbon conversions known in the art. The required processing conditions depend upon the specific reactions, the charging stocks involved, and the presence or absence of other catalytic materials, and may readily be determined from the teachings of the prior-art. By adjusting, that is, decreasing, pore size of alumina in accordance with the present invention, reaction of molecules of certain sizes, that is, molecules which fit within the adjusted pores, may be favored. For such purposes the pores of the alumina usually contain other catalytic substances, as described above. Alumina of adjusted pore size may also be advantageously used for separation purposes, e.g., as a molecular sieve.

When employing the improved alumina of the present invention in a halogen-containing platinum-alumina hydroforming catalyst, about 0.01 to 1.0 percent by weight of platinum and about 0.05 to 2 percent by weight of halogen, usually chlorine or fluorine, are incorporated during manufacture. The platinum and halogen may be incorporated separately, or together; and when incorporated together, it is conveniently done so by employing a halogen-containing platinum compound, e.g., chloroplatinic acid, platinum tetrachloride, platinous chloride, platinic fluoride, and the like. For such purposes, the halogen and/or platinum may be incorporated before or after treating the hydrous alumina with hydrogen peroxide or after the hydrous alumina is dried and calcined.

In a specific embodiment, a Heard type alumina hydrosol is commingled, by stirring, with an aqueous solution containing about 25 to 35 percent by weight, based on solution, of $H_2O_2$, the ratio of $H_2O_2$ to $Al_2O_3$ being in the range of about 0.5 to 2.0, for a period of about 0.5 to 5 minutes at ambient temperature and essentially atmospheric pressure. The resulting treated alumina hydrosol is then co-gelled with chloroplatinic acid, thereafter dried and calcined, crushed, lubricated (e.g., with Sterotex, a hydrogenated coconut oil), pelleted (e.g., ⅛" x ⅛" cylindrical pellets), and again calcined. The resulting catalyst may contain about 0.6 percent by weight of platinum and about 0.6 percent by weight of chlorine. It exhibits very-high activity when employed as a catalyst for upgrading petroleum naphthas under reforming conditions (e.g., 800–1050° F., 100–1200 p.s.i.g., 0.5 to 5.0 weight-hourly space velocity, and hydrogen recycle rate of 1000–10,000 standard cubic feet per barrel of naphtha).

The following specific example will more clearly illustrate the technique and advantages of the present invention.

*Example*

A Heard type alumina hydrosol was prepared by reacting metallic aluminum with water in the presence of mercuric oxide and dilute acetic acid. The resulting hydrosol contained 6.4 percent by weight of $Al_2O_3$. One portion of the resulting hydrosol was dried for about 4 hours at 400° F. and then calcined for about 6 hours at 1000° F. To another portion of the same alumina hydrosol was added an aqueous solution containing about 30 percent by weight, based on solution, of $H_2O_2$, in sufficient quantity to give a weight ratio of $H_2O_2$ to $Al_2O_3$ of about 1. The commingled alumina hydrosol and hydrogen peroxide was stirred for about one minute at ambient temperatures and essentially atmospheric pressure. The treated alumina hydrosol was then dried for about 4 hours at 400° F. and calcined for 6 hours at 1000° F. Surface area and pore volume of the resulting gamma-type aluminas were then determined and pore diameter derived therefrom. The results for both alumina preparations are presented in the following tabulation:

| $H_2O_2$ treated | Surface area, $M^2$/gram | Micro-pore vol., cc./gram | Avg. pore dia., Angstroms |
|---|---|---|---|
| Yes | 341 | .506 | 60.2 |
| No | 231 | .433 | 75.1 |

The above results clearly demonstrate the substantial increase in surface area and pore volume, and consequent decrease in pore diameter, associated with the present invention. When platinum and chlorine are incorporated into the resulting alumina by impregnation with chloroplatinic acid, activity of the resulting catalyst when employed for reforming petroleum naphthas is substantially increased. Moreover, the number of regenerations to which the catalyst can be subjected before surface area falls below levels which make further operations uneconomic, is more than doubled. At the same time chloride retention by the catalyst is substantially improved.

To demonstrate that hydrogen peroxide treatment of alumina in accordance with the present invention is applicable only when the alumina is in the form of hydrous alumina, as hereinabove defined, three platinum-alumina catalysts were prepared by co-gelling chloroplatinic acid with an untreated Heard-type alumina hydrosol similar to that used in preparation of the alumina above. The co-gelled platinum-alumina was dried, calcined, crushed, lubricated with Sterotex, pelleted, and recalcined. The resulting catalytic composites, which contained less than about 5 percent by weight of chemiesorbed water and had surface areas of about 225 to 240 square meters per gram, were employed for reforming various naphthas boiling in the range of about 100 to 400° F., at temperatures in the range of about 900 to 975° F., at pressures in the range of about 200 to 350 p.s.i.g., at space velocities in the range of about 1 to 2.5, and at hydrogen thruput rates of about 3,000 to 6,000 standard cubic feet per barrel of naphtha.

After a number of on-stream cycles and regenerations with oxygen-containing gases at temperatures in the range of 750 to 1050° F., surface areas of the aluminas were reduced to the range of about 90 to 170 square meters per gram. A portion of each was then treated with an aqueous solution containing about 30 percent by weight, based on solution, of $H_2O_2$, followed by calcination. Surface measurements of the composition before and after the hydrogen peroxide treatment showed no change in surface areas, thus demonstrating that a hydrogen peroxide treatment of calcined aluminas has no effect upon surface areas.

While the invention has been described with reference to certain examples and operating embodiments, it is to be understood that such examples and embodiments are illustrative only and not by way of limitation. Numerous additional embodiments of the invention will be apparent from the foregoing description to those skilled in the art.

In accordance with the foregoing description, what is claimed is:

1. A method of preparing alumina of increased surface area which comprises contacting previously prepared hydrous alumina, prior to drying and calcining, with a solution containing from about 5 to about 98 weight percent hydrogen peroxide in an amount whereby the weight ratio of $H_2O_2$ to $Al_2O_3$ is between about 0.1 and 10 for a period in excess of about 0.1 minute, thereafter drying and calcining.

2. The method of claim 1 which includes the step of impregnating the dried and calcined alumina with a solution containing 0.01 to 1 percent by weight, based on dry $Al_2O_3$, of platinum.

3. A method of preparing alumina of increased surface area which comprises commingling previously prepared hydrous alumina, prior to drying and calcining, and a solution containing about 5 to 98 weight percent hydrogen peroxide in a weight ratio of $H_2O_2$ to $Al_2O_3$ of between about 0.1 and 10 for a contacting period in excess of about 0.1 per minute, and thereafter drying and calcining.

4. A method of raising the surface area of alumina which comprises subjecting previously prepared hydrous alumina, prior to drying and calcining, to contact with a solution containing about 10 to 50 weight percent hydrogen peroxide in a weight ratio of $H_2O_2$ to $Al_2O_3$ of between about 0.5 and 2 for a period in excess of about 0.1 per minute, thereafter drying and calcining.

5. In the method of preparing alumina which comprises drying and calcining hydrous alumina, the improvement which comprises subjecting said hydrous alumina, prior to drying and calcining, to an aqueous solution containing at least 5 percent by weight, based on said aqueous solution of hydrogen peroxide, for a period in excess of about 0.1 minute, whereby an alumina of increased surface is obtained.

6. A method of preparing a halide-containing, platinum-alumina catalyst of increased surface area and improved halide retention which comprises contacting previously prepared hydrous alumina, prior to drying and calcining, with a solution containing at least about 5 percent by weight, based on said solution, of hydrogen peroxide in a weight ratio of $H_2O_2$ to $Al_2O_3$ of between about 0.1 and 10 for a period in excess of about 0.1 minute, drying and calcining the resulting hydrous alumina, and introducing into the dried and calcined alumina about 0.1 to 1 percent by weight of platinum and 0.05 to 2 percent by weight of halogen, based on $Al_2O_3$.

7. A method of preparing platinum alumina catalyst of increased surface area which comprises contacting previously prepared alumina hydrosol, prior to drying and calcining, with an aqueous solution containing about 10 to 50 per cent by weight, based on solution, of hydrogen peroxide in a weight ratio of $H_2O_2$ to $Al_2O_3$ of between about 0.1 to 10 for at least about 0.1 minute, co-gelling a platinum compound with said alumina hydrosol to platinum levels of about 0.1 to 1 percent by weight, based on $Al_2O_3$, thereafter drying and calcining.

8. The method of claim 7 wherein the platinum compound is cogelled with said hydrosol prior to contacting said hydrosol with hydrogen peroxide.

9. A halide-containing platinum-alumina catalyst, characterized by having high surface area of at least about 340 square meters per gram and improved halide retention, prepared by producing an alumina hydrosol, contacting said alumina hydrosol, prior to drying and calcining, with a solution containing at least 5 weight percent hydrogen peroxide, said hydrogen peroxide in said solution being in a weight ratio of $H_2O_2$ to $Al_2O_3$ of between about 0.1 and 10, effecting said contacting at ambient temperatures and essentially atmospheric pressure for a period of 0.1 and 10 minutes, subjecting said alumina hydrosol and hydrogen peroxide solution to agitation for a time not in excess of about 1 minute, drying and calcining the treated alumina hydrosol for 1 to 24 hours at about 200° to 600° F., and for about 1 to 24 hours at about 600 to 1200° F., respectively, and introducing into the dried and calcined treated alumina about 0.1 to 1 percent by weight of platinum and 0.05 to 2 percent by weight of halogen, based on $Al_2O_3$.

10. A method of preparing an alumina catalyst of increased surface area which method comprises incorporating another catalytic substance into previously prepared hydrous alumina, said catalytic substance comprising between about 0.01 to 1.0 percent by weight, based on dry $Al_2O_3$, of platinum, contacting the platinum-containing hydrous alumina, prior to drying and calcining, with a solution containing from about 5 to about 98 percent hydrogen peroxide in an amount whereby the weight ratio of $H_2O_2$ to $Al_2O_3$ is between about 0.1 and 10 for a period in excess of about 0.1 minute, and thereafter drying and calcining.

References Cited in the file of this patent

UNITED STATES PATENTS 2,852,473 Welling ---------------- Sept. 16, 1958
2,895,920 Janoski ---------------- July 21, 1959